F. ECAUBERT.
DENTAL CLEANING DEVICE.
APPLICATION FILED MAR. 28, 1914.
1,287,926.
Patented Dec. 17, 1918.
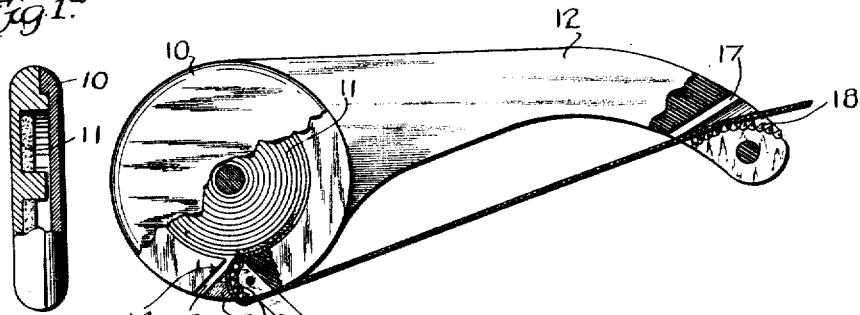
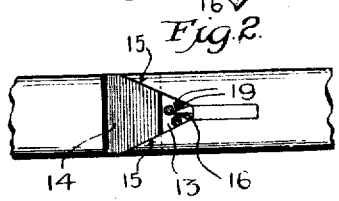
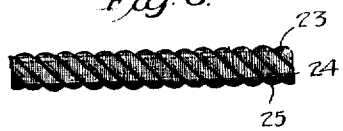
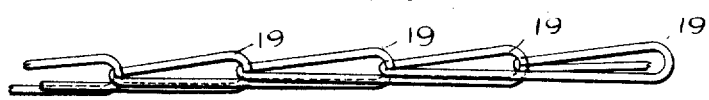
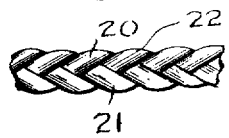
WITNESSES
INVENTOR
Frederic Ecaubert
BY
ATTORNEYS

UNITED STATES PATENT OFFICE.

FREDERIC ECAUBERT, OF BROOKLYN, NEW YORK.

DENTAL CLEANING DEVICE.

1,287,926.      Specification of Letters Patent.      Patented Dec. 17, 1918.

Application filed March 28, 1914. Serial No. 827,903.

*To all whom it may concern:*

Be it known that I, FREDERIC ECAUBERT, a citizen of the United States, residing in the borough of Brooklyn, county of Kings, and State of New York, have invented certain new and useful Improvements in Dental Cleaning Devices, of which the following is a full and clear specification.

The present invention relates to dental cleaning devices, such as dental floss and the like. Dental floss at the present time is put up in various forms, some of which comprise a receptacle or holder in which a length of the floss can be drawn out from the supply and held under tension for use.

According to my invention, a new form of dental floss is produced, which is not only superior in its cleaning properties, but is peculiarly adapted for being positively secured under tension between two supporting members at any portion of its length for the cleaning operation.

Dental floss is ordinarily flat and of a size to pass between two teeth. According to my invention the dental floss is constructed of one or more strands of smaller cross section than the usual dental floss, so that the aggregate area of cross section will approximate that of the usual dental floss.

One important object of my invention is to provide a dental floss which will have better cleaning properties and which will more readily conform itself to the shape and dimensions of the variously shaped spaces through which it may be passed. Another object is to provide a form of dental floss of which any portion of its length may be readily secured under tension in a holder.

I attain these and other objects of my invention by constructing the floss in the form of a chain, looping, lock stitch, braid, woven tape, or the like, so that portions disposed transversely or substantially transversely of the main axis are present and a broken or non-continuous outer surface is provided. One especially advantageous way of providing these conditions is to produce a series of short interlocking loops or stitches so that in addition to gaining the transverse portions, which give the uneven outer surface and adapt the floss to being readily secured under tension, strands which have more or less freedom to assume different relative positions are provided, whereby the floss will more readily conform itself to the shape and dimensions of the space into which it is introduced.

Any desired number of strands may be employed, but to clearly illustrate the invention I have shown in the accompanying drawing certain embodiments of the invention in which one, two and three separate strands are employed.

In said drawing,

Figure 1 is a face view, with parts in section, of a holder provided with a supply of the improved dental floss;

Fig. 1ª is a central transverse section of the case;

Fig. 2 is an enlarged edge view of a portion of the holder;

Fig. 3 is an enlarged view of a construction of the dental floss in which a single strand is looped into a three strand form;

Fig. 4 is a similar view showing interlocking loops formed from three separate strands;

Fig. 5 is a detail view showing conformation of the dental floss to the size and shape of the space into which it is inserted;

Fig. 6 is an enlarged view of three separate strands twisted together in such manner as to form a dental floss in which the fibers extend transversely of the dental floss;

Fig. 7 is a similar view of two separate strands looped together to form two strand dental floss.

Referring to Figs. 1 and 2, the dental floss holder herein shown may be made preferably of suitable resilient material such as celluloid to obviate the necessity for special mechanical devices to obtain tension, and comprises a housing or case 10, for a coil or roll of dental floss 11, and tensioning arm 12, projecting from the case 10. The case 10 is provided with a slot 13, which has an end wall 14 inclined to the diameter of the case and side walls 15 inclined to the main plane of the case. Disposed in the narrow side of the slot thus produced is a preferably curved series of projecting teeth 16, the plate upon which they are formed being embedded in the celluloid in the molding operation and afterward cut off flush with the case. A similar slot or recess 17 provided with teeth 18 is formed in the outer end of the tensioning arm 12. The dental floss in the form of a chain, for example, is drawn from the supply 11 through the slot 13 near the wall 14, where it is clear of the projecting teeth 16, and passed through the slot 17 clear of the teeth 18, after which, by pulling on the projected length of dental floss, the teeth 16 will pass through the loops or otherwise positively engage the transverse portions of the dental floss in the slot 13. By pressing inward the outer end of tensioning arm 12 and bringing the dental floss into engagement with the teeth 18, the projected length will thereby be secured under tension between the two sets of teeth. By having the transverse portions at short intervals, any variation in the normal length or spring of the arm 12 is rendered immaterial.

Fig. 3 illustrates one of the preferred forms of looped construction for the dental floss, a plurality of interlocking loops 19 being produced from a single strand, forming virtually a three strand dental floss.

Fig. 4 illustrates a braided construction, in which three separate strands 20, 21 and 22 are disposed in diagonally transverse direction and form relatively flat interlocking loops.

Fig. 5 shows how the three strands provided by the construction illustrated in Fig. 3 can assume positions in a single plane to facilitate passage of the dental floss through a restricted opening.

Fig. 6 shows a twisted construction in which three strands 23, 24 and 25 are formed into a cord with their individual fibers extending transversely of the main axis of the cord, which is accomplished by reversing the direction of twist employed in the ordinary form of rope.

Fig. 7 illustrates a dental floss formed of two separate strands 26 and 27 which are looped together into the form of more or less extended "flat knots."

In all forms of the invention herein illustrated, an irregular outer surface is provided by the transverse portions of the strands or fibers, and the cleaning operation as well as the locking under tension is improved. The irregular outer surface affords a more or less abrasive action as in the case of a file, for example. The loose strand constructions shown for example in Figs. 3 and 7 are especially well adapted to changes of cross sectional area and shape to facilitate passage through restricted openings and to conform themselves to irregular or varying spaces between the teeth. The transverse portions are in all cases provided at relatively close intervals so as to enable the securing of the desired portion of dental floss under the tension in the holder without having to regard the location of the stops thus provided.

The dental floss herein shown is preferably provided with wax.

I claim:

1. A device of the character described, comprising in combination a length of dental floss formed of strand material having transversely extending portions at short intervals, and means for engaging the transverse portions thereof to hold the floss under tension.

2. A device of the character described, comprising in combination a holder having a slotted case with a slotted tensioning arm projecting therefrom, pointed teeth exposed in said slots, and a supply of dental floss formed of strand material having transversely extending portions adapted to positively engage the said pointed teeth.

FREDERIC ECAUBERT.

Witnesses:
OCTAVIUS KNIGHT,
M. G. CRAWFORD.

Copies of this patent may be obtained for five cents each, by addressing the "Commissioner of Patents, Washington, D. C."